INVENTOR
ARNOLD T. MILLS

March 4, 1969     A. T. MILLS     3,430,654
VALVE FOR CONTROLLING THE RATE OF FLOW OF SOLIDS
Filed March 20, 1967

INVENTOR
ARNOLD T. MILLS
BY Young & Thompson
ATTYS.

United States Patent Office 3,430,654
Patented Mar. 4, 1969

3,430,654
VALVE FOR CONTROLLING THE RATE OF FLOW OF SOLIDS
Arnold T. Mills, Bulawayo, Rhodesia, assignor, by mesne assignments, to Hilux Holdings Societe Anonyme, Gare, Luxembourg, a corporation of Luxembourg
Filed Mar. 20, 1967, Ser. No. 624,493
U.S. Cl. 137—625.28        7 Claims
Int. Cl. F16k 3/24

ABSTRACT OF THE DISCLOSURE

A valve for controlling the flow of solids having a hollow core with slots in its side walls and its axis vertical, a sleeve surrounding the core and spaced from it a distance at least equal to three times the diameters of the largest particles present in the solid material, and means for moving the sleeve up and down so that the sleeve obturates the slots to varying vertical extents.

---

This invention relates to a valve for controlling the rate of flow of solid materials.

Conventionally the vertical flow of comminuted solids is controlled by valves which may be characterised as gate valves. In the fully closed position and in intermediate control positions the valve member carries the full load of the body of solids above the valve and therefore large and strong bearing surfaces have to be provided.

An object of the invention is to provide a valve of a different type which will not require large and strong bearing surfaces.

A valve according to the invention consists in a substantially vertical retaining wall for the solids, an orifice through the retaining wall, and a valve member vertically movable in a path parallel to the outer surface of the retaining wall and spaced from it a distance at least equal to three times the diameter of the largest particles present in the solid material, the valve member being movable to obturate the orifice in a horizontal direction to varying vertical extents.

The orifice is conveniently a vertical slot which preferably is wider at the top than at the bottom so that the rate of flow varies more nearly in proportion to the rate of displacement of the valve member.

In one form of the invention the valve has an open-topped cylindrical body with its axis substantially vertical and its lower end closed off, a series of orifices through the body adjacent the closed end and a cylindrical sleeve member surrounding the body and adapted to be moved up and down along the body to obturate the orifices to varying degrees.

The invention also provides that the sleeve be supported off an encircling ring by a pair of radially opposed bearings, up and down sliding motion being imparted to the ring so that vertical movement of the sleeve is to a limited extent independent of the alignment of the ring. Furthermore the ring itself is preferably supported off a second encircling ring or clevis by a second pair of radially opposed bearings, the second pair being substantially coplanar with the first pair but at right angles to the first pair, up and down movement being in the first instance imparted to the second ring or clevis.

Further according to the invention up and down movement is imparted to the clevis by a lever pivoted on fixed structure. In the case of a shrouded valve the invention provides that the lever passes through an aperture in the shroud and is secured to a cranked shaft pivoted on the fixed structure in the plane of the aperture and cranked to move outside that plane, sealing means being provided at the aperture.

Figure 1:
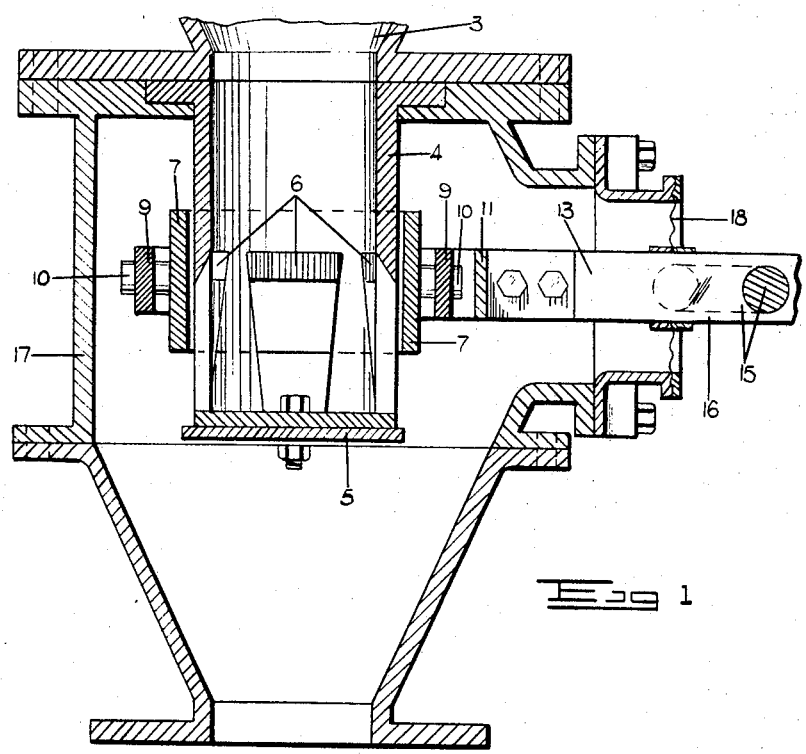
Figure 2:
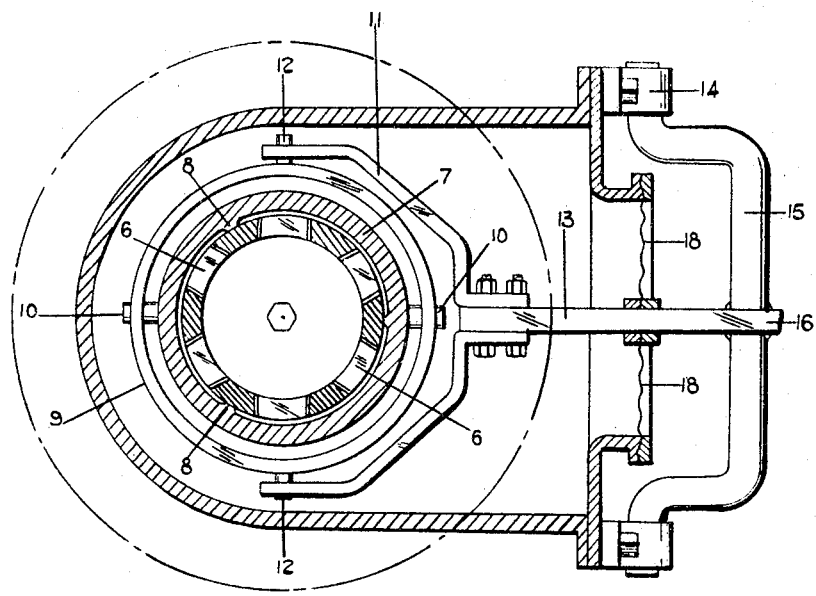
Figure 3:
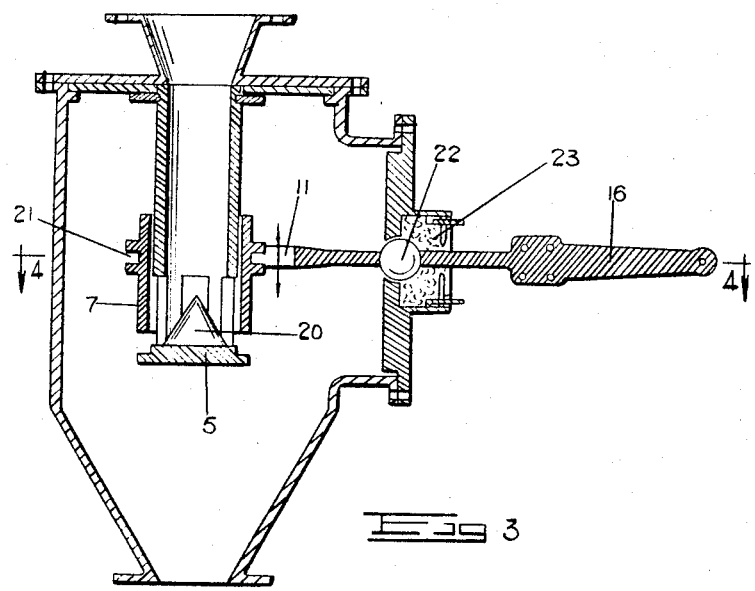
Figure 4:
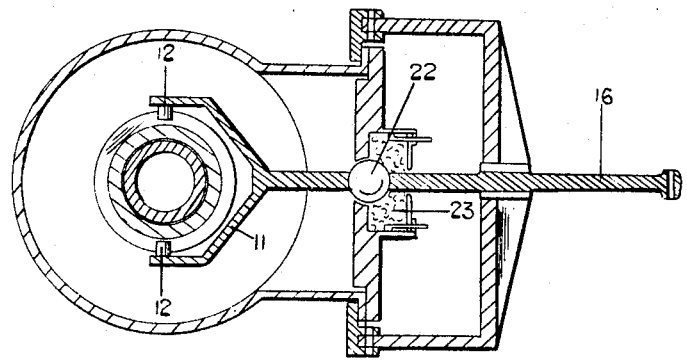

An example of the invention is illustrated in the accompanying drawings, in which:

FIGURE 1 is a vertical section through a valve according to the invention,
FIGURE 2 is a plan view partly in section of the valve of FIGURE 1,
FIGURE 3 is a view similar to FIGURE 1 of a modification on a smaller scale, and
FIGURE 4 is a plan view of the modification of FIGURE 3.

In the example of FIGURES 1 and 2 the valve is attached at the foot of a vessel 3 and has a body 4 attached to the vessel as a nozzle of circular section. The body 4 is closed off by a plate 5. The body is formed with slots 6 which in this case are six in number. Each slot 6 tapers and is wider at the top than at the bottom.

Surrounding the body 4 is an obturating skirt 7. Splines 8 inside the skirt 7 serve as spacers. In order to reduce friction the splines 8 taper as shown.

The skirt 7 is surrounded by a ring 9 and is connected to the ring 9 by means of stub axles 10 journalled on the ring 9. The axles 10 are diametrally opposed. A clevis 11 fits around the ring 9 and stub axles 12 on the ring 9 are journalled on the clevis 11. The axles 12 are also diametrally opposed on a diameter at right angles to the diameter of the axles 10.

The valve shown is enclosed in a shell 17. If the valve is used at the foot of a segregation column an inert or nonoxidizing atmosphere is necessary within the shell 17.

The invention provides the construction shown in the drawing for sealing the point where the shank 13 of the clevis passes through the shell 17.

The shank 13 is secured to a cranked shaft 15 journalled in bearings 14 on the shell. A flexible diaphragm 18 around the shank 13, seals off the hole through which the shank 13 passes. Note that the diaphragm is in a plane containing the pivot line of the shaft 15.

An extension 16 on the shank 13 serves as a lever for operating the valve The lever may be operated by any suitable means. Operation of the lever 16 causes the skirt 7 to move up or down as the case may be. In view of the fact that the diaphragm 18 is in a plane containing the pivot point, movement of the diaphragm is not very large.

Note that the skirt 7 slides up and down and merely determines the effective height of each slot 6 and thus the ridge of the solids emerging from the slot 6 at the angle of repose of the material. The skirt 7 need never close off against the plate 5.

The modification of FIGURES 3 and 4 has parallel-sided slots. In addition a cone 20 is mounted on the plate 5. The angle that the cone makes with the plate is larger than the angle of repose of the material being handled. The pins 12 on the clevis 11 fit in an annular groove 21 on the sleeve 7 so that an intermediate ring is dispensed with.

In this case also the valve is shrouded with a cranked pivot outside the shroud. However, the arm 16 has a ball 22 seating on a spherical aperture in the shroud 17. The ball is backed by a packing 23 of high temperature resistant material.

I claim:
1. A valve for controlling the flow of solids consisting in an open-topped cylindrical body, with a vertical axis the open top of which is adapted to be connected to a source of solids, a closure to the lower end of the cylinder, a cone, mounted on the closure, coaxial with the cylinder and making an angle with the closure at least equal to the angle of repose of the solids being controlled, a series of orifices through the body adjacent the closed end, and a cylindrical sleeve member surrounding the body at a spacing at least equal to three times the diameter of the largest particles present in the solid material, and the sleeve member being adapted to be moved up and down along the body to obturate the orifices to varying degrees.

2. A valve for controlling the flow of solids consisting in an open-topped cylindrical body, with a vertical axis the open top of which is adapted to be connected to a source of solids, a closure to the lower end of the cylinder, a series of orifices through the body adjacent the closed end, and a cylindrical sleeve member surrounding the body at a spacing at least equal to three times the diameter of the largest particles present in the solid material, the sleeve member being supported off an encircling ring by a pair of radially opposed bearings, and movable up and down along the body to obturate the orifices to varying degrees, up and down sliding motion being imparted to the ring so that the vertical movement of the sleeve to obturate the orifices to varying degrees is to a limited extent independent of the alignment of the ring.

3. The valve claimed in claim 2 in which the ring is supported off a second encircling ring or clevis by a second pair of radially opposed bearings, the second pair being at right angles to the first pair, up and down movement being imparted in the first instance to the second ring or clevis.

4. The valve claimed in claim 3 in which up and down movement is imparted to the second ring or clevis by a lever pivoted on fixed structure.

5. A valve for controlling the flow of solids consisting in an open-topped cylindrical body, with a vertical axis the open top of which is adapted to be connected to a source of solids, a closure to the lower end of the cylinder, a series of orifices through the body adjacent the closed end, and a cylindrical sleeve member which is formed with a circumferential groove and is supported off an encircling ring or clevis by pins entering into the groove, surrounding the body at a spacing at least equal to three times the diameter of the largest particles present in the solid material, and the sleeve member being adapted to be moved up and down along the body to obturate the orifices to varying degrees.

6. The valve claimed in claim 5 in which up and down movement is imparted to the encircling ring or clevis by a lever pivoted on fixed structure.

7. The valve claimed in claim 6 including a shroud, the lever passing through an aperture in the shroud and being secured to a cranked shaft pivoted on the fixed structure in the plane of the aperture and cranked to move outside that plane, sealing means being provided at the aperture.

References Cited

UNITED STATES PATENTS

| 21,433 | 1858 | McGray | 137—625.28 X |
| 937,828 | 10/1909 | Little | 251—205 X |
| 1,065,494 | 6/1913 | Anderson | 251—205 |
| 1,919,955 | 7/1933 | Leech et al. | 251—205 X |
| 3,060,957 | 10/1962 | Richards | 251—343 X |

FOREIGN PATENTS 967,482   8/1964   Great Britain.

ARNOLD ROSENTHAL, *Primary Examiner.*

U.S. Cl. X.R.

222—523; 251—335, 235